US012678926B2

(12) United States Patent
Alexandersson et al.

(10) Patent No.: US 12,678,926 B2
(45) Date of Patent: Jul. 14, 2026

(54) COOLING SYSTEM FOR A POWER TOOL

(71) Applicant: HUSQVARNA AB, Huskvarna (SE)

(72) Inventors: Daniel Alexandersson, Huskvarna (SE); Mikael Arvidsson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 673 days.

(21) Appl. No.: 17/265,943

(22) PCT Filed: Aug. 27, 2019

(86) PCT No.: PCT/EP2019/072809
§ 371 (c)(1),
(2) Date: Feb. 4, 2021

(87) PCT Pub. No.: WO2020/043707
PCT Pub. Date: Mar. 5, 2020

(65) Prior Publication Data
US 2021/0299844 A1 Sep. 30, 2021

(30) Foreign Application Priority Data

Aug. 31, 2018 (SE) .................................... 1851031-3

(51) Int. Cl.
*B25F 5/00* (2006.01)
*A01G 3/053* (2006.01)
(52) U.S. Cl.
CPC .............. *B25F 5/008* (2013.01); *A01G 3/053* (2013.01)
(58) Field of Classification Search
CPC ........... B25F 5/008; A01G 3/053; H02K 5/20; H02K 5/207; H02K 7/145; H02K 9/06
(Continued)

(56) References Cited

U.S. PATENT DOCUMENTS 2,272,985 A * 2/1942 Smith ........................ A47L 9/22
415/199.1
2,320,113 A * 5/1943 Wilhide .................. H02K 1/185
173/217
(Continued)

FOREIGN PATENT DOCUMENTS

CN 102149515 A 8/2011
CN 110099772 A 8/2019
(Continued)

OTHER PUBLICATIONS

Oxford English Dictionary, entry for handheld.*
(Continued)

*Primary Examiner* — Shelly M Self
*Assistant Examiner* — David G Shutty
(74) *Attorney, Agent, or Firm* — Burr & Forman

(57) ABSTRACT

A power tool (1) is disclosed comprising an electric motor (3) configured to power a tool (5) of the power tool (1), a power supply arrangement (7, 9) configured to supply electricity to the electric motor (3), and an air-cooling path (11, 11') extending past at least portions of the electric motor (3) and the power supply arrangement (7, 9) so as to cool the electric motor (3) and the power supply arrangement (7, 9) when air is flowing through the air-cooling path (11, 11'). The power tool (1) further comprises a fan (13) arranged in the air-cooling path (11, 11') between the electric motor (3) and the power supply arrangement (7, 9). The fan (13) is configured to generate an air flow through the air-cooling path (11, 11') in a flow direction (d) from the electric motor (3) towards the power supply arrangement (7, 9).

8 Claims, 2 Drawing Sheets

(58) Field of Classification Search

USPC .......................................................... 173/217

See application file for complete search history.

(56)  References Cited

U.S. PATENT DOCUMENTS

| | | | | |
|---|---|---|---|---|
| 2,796,542 | A * | 6/1957 | Bekey | H02K 19/24 |
| | | | | 310/410 |
| 4,684,860 | A * | 8/1987 | Heyraud | H02P 8/42 |
| | | | | 318/696 |
| 4,688,324 | A * | 8/1987 | Morrill | H02K 7/085 |
| | | | | 310/90 |
| 4,757,224 | A * | 7/1988 | McGee | H02K 21/44 |
| | | | | 310/216.107 |
| 5,052,497 | A * | 10/1991 | Houben | B25D 11/005 |
| | | | | 173/202 |
| 6,123,158 | A * | 9/2000 | Steffen | H02K 11/33 |
| | | | | 173/217 |
| 6,127,751 | A * | 10/2000 | Kristen | B25D 17/20 |
| | | | | 173/117 |
| 6,384,494 | B1 * | 5/2002 | Avidano | H02K 9/06 |
| | | | | 310/58 |
| 6,543,549 | B1 * | 4/2003 | Riedl | B25F 5/02 |
| | | | | 173/171 |
| 6,866,105 | B2 * | 3/2005 | Pfisterer | B25F 5/008 |
| | | | | 173/217 |
| 6,971,456 | B2 * | 12/2005 | Yamada | B25F 5/008 |
| | | | | 173/217 |
| 7,166,939 | B2 * | 1/2007 | Voigt | H02K 9/06 |
| | | | | 310/47 |
| 7,308,950 | B2 * | 12/2007 | Faatz | B25F 5/008 |
| | | | | 173/171 |
| 7,646,118 | B2 * | 1/2010 | Yoshida | H02K 9/227 |
| | | | | 310/60 R |
| 7,705,497 | B2 * | 4/2010 | Arich | B25D 16/00 |
| | | | | 310/58 |
| 7,733,054 | B2 * | 6/2010 | Phillips | H01M 10/613 |
| | | | | 320/112 |
| 7,768,750 | B2 * | 8/2010 | Uchida | B25F 5/00 |
| | | | | 361/33 |
| 7,786,627 | B2 * | 8/2010 | Riedl | B25F 5/008 |
| | | | | 310/60 R |
| 7,939,193 | B2 * | 5/2011 | Moores, Jr. | H01M 10/6557 |
| | | | | 429/62 |
| 8,333,252 | B2 * | 12/2012 | Britz | B25F 5/008 |
| | | | | 173/171 |
| 8,418,780 | B2 * | 4/2013 | Lau | B25F 5/008 |
| | | | | 173/171 |
| 8,487,490 | B2 * | 7/2013 | Dutau | H02K 9/06 |
| | | | | 310/59 |
| 9,124,145 | B2 * | 9/2015 | Lau | H02K 5/18 |
| 9,132,542 | B2 * | 9/2015 | Lau | B25F 5/008 |
| 9,287,751 | B2 * | 3/2016 | Naito | B25F 5/008 |
| 9,397,535 | B2 | 7/2016 | Yamaguchi et al. | |
| 9,590,475 | B2 | 3/2017 | Oomori et al. | |
| 9,770,821 | B2 * | 9/2017 | Racov | A01D 34/4163 |
| 9,776,338 | B2 | 10/2017 | Abe et al. | |
| 10,044,245 | B2 * | 8/2018 | Bekavac | H02K 11/028 |
| 10,232,502 | B2 * | 3/2019 | Bylund | F04D 25/06 |
| 10,369,672 | B2 * | 8/2019 | Bergquist | B25F 5/008 |
| 10,638,900 | B2 * | 5/2020 | Hayamitsu | F04D 25/06 |
| 10,807,226 | B2 * | 10/2020 | Bernhart | B25D 17/00 |
| 11,052,502 | B2 * | 7/2021 | Weiss | B23Q 11/1092 |
| 2002/0034682 | A1 | 3/2002 | Moores, Jr. et al. | |
| 2004/0263008 | A1 * | 12/2004 | Voigt | H02K 9/06 |
| | | | | 310/58 |
| 2006/0013712 | A1 * | 1/2006 | Lee | F04D 31/00 |
| | | | | 417/366 |
| 2008/0106159 | A1 | 5/2008 | Yoshida et al. | |
| 2008/0315693 | A1 | 12/2008 | Uchida | |
| 2009/0026859 | A1 * | 1/2009 | Kinoshita | H02K 29/08 |
| | | | | 310/68 B |
| 2010/0218385 | A1 * | 9/2010 | Mang | B25F 5/008 |
| | | | | 30/298 |
| 2010/0253162 | A1 * | 10/2010 | Sakamaki | B25D 16/00 |
| | | | | 310/50 |
| 2011/0303718 | A1 * | 12/2011 | Spasov | B25F 5/006 |
| | | | | 165/287 |
| 2013/0200733 | A1 | 8/2013 | Lau | |
| 2014/0339930 | A1 | 11/2014 | Bekavac | |
| 2015/0183125 | A1 | 7/2015 | Kumakura et al. | |
| 2015/0336232 | A1 * | 11/2015 | Bergquist | B25F 5/008 |
| | | | | 173/1 |
| 2017/0021489 | A1 * | 1/2017 | Bylund | F04D 19/002 |
| 2017/0098981 | A1 | 4/2017 | Chou | |
| 2017/0239803 | A1 | 8/2017 | Aoki | |
| 2018/0131058 | A1 | 5/2018 | Wang et al. | |
| 2018/0266426 | A1 * | 9/2018 | Lee | A47L 9/22 |
| 2021/0299844 | A1 * | 9/2021 | Alexandersson | A01G 3/053 |

FOREIGN PATENT DOCUMENTS

| | | | | |
|---|---|---|---|---|
| DE | 102004063751 | A1 | 7/2006 | |
| DE | 102007039828 | B3 * | 11/2008 | B25D 17/20 |
| DE | 102009015422 | A1 | 10/2009 | |
| EP | 2747949 | A1 | 7/2014 | |
| EP | 2747949 | B1 * | 11/2017 | A01G 3/053 |
| GB | 2063441 | A | 6/1981 | |
| JP | 2008132551 | A | 6/2008 | |
| JP | 2011148068 | A | 8/2011 | |
| JP | 201331922 | A | 2/2013 | |
| JP | 2015120208 | A | 7/2015 | |
| JP | 2018187699 | A | 11/2018 | |
| WO | 2013032372 | A1 | 3/2013 | |
| WO | 2013062457 | A1 | 5/2013 | |

OTHER PUBLICATIONS

Credo Reference, entry for handheld.*
International Search Report and Written Opinion for International Application No. PCT/EP2019/072809 mailed on Nov. 15, 2019.
Swedish Office Action and Search Report for Swedish Application No. SE1851031-3, Mailed on Feb. 26, 2019.

* cited by examiner

COOLING SYSTEM FOR A POWER TOOL

TECHNICAL FIELD

The present disclosure relates to power tool. More specifically, the present invention relates to an electrically driven hand-held power tool.

BACKGROUND

Today, there are many kinds of power tools available on the market. Examples are chain saws, circular saws, trimmers, hedge trimmers, lawn mowers, multi-tools, drills, and the like. Power tools are for example used in industry, in construction, in gardens, for housework tasks, and around houses for purposes of driving fasteners, drilling, cutting, shaping, sanding, grinding, routing, polishing, painting, heating, and the like.

A common feature of power tools is that they comprise a tool which can be driven by a power source other than solely manual labour. Today, many power tools comprise an electric motor configured to power the tool. Electric motors provide several advantages over combustion engines especially it comes to emission levels, efficiency, noise levels, weight, and the like. Some electrically driven power tools comprise batteries and some power tools comprise an electrical connection for connecting the power tool to an electric power supply. In order to satisfy demands from consumers and professional users, many power tools are provided with powerful electric motors which requires powerful power supply arrangements, such as control units and batteries. Electrical components such as electrical motors and power supply arrangements produce heat during operation and more heat is generated when the power level is high. In order to obtain a reliable power tool, and in order to allow for a certain operational time, this heat is preferably transferred from the electrical components.

Common problems associated with power tools are operational reliability and noise levels generated during operation. Furthermore, generally, on today's consumer market, it is an advantage if products, such as power tools, have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a hand-held power tool comprising an electric motor configured to power a tool of the power tool, a power supply arrangement configured to supply electricity to the electric motor, an air-cooling path extending past at least portions of the electric motor and the power supply arrangement so as to cool the electric motor and the power supply arrangement when air is flowing through the air-cooling path, and a fan arranged in the air-cooling path between the electric motor and the power supply arrangement, wherein the fan is configured to generate an air flow through the air-cooling path in a flow direction from the electric motor towards the power supply arrangement.

Since the fan is configured to generate an air flow through the air-cooling path in a flow direction from the electric motor towards the power supply arrangement, an efficient cooling of the electric motor and the power supply arrangement is provided. As a further result thereof, a more reliable power tool is provided, and the electric motor and the power supply arrangement are allowed to operate at high power levels without becoming overheated.

During operation of the power tool, the electric motor may be the component that generates the most heat. However, since the fan is configured to generate an air flow in a flow direction from the electric motor towards the power supply arrangement, the electric motor will be subjected to the most efficient cooling. This because the electric motor is cooled using unheated ambient air. Thus, since the fan is configured to generate an air flow in a flow direction from the electric motor towards the power supply arrangement, the electric motor is allowed to operate at high power levels without becoming overheated.

Moreover, since the fan is arranged in the air-cooling path between the electric motor and the power supply arrangement, the fan is positioned at a position at the power tool where it is more protected from becoming stuck by objects entering the air-cooling path. Thus, as a further result, conditions are provided for an even more reliable power tool.

Still further, since the fan is arranged in the air-cooling path between the electric motor and the power supply arrangement, the noise generated by the fan can be attenuated in a more efficient manner. Thereby, conditions are provided for a power tool generating less noise during operation.

Furthermore, since the power tool comprises the air-cooling path and since the fan is arranged in the air-cooling path between the electric motor and the power supply arrangement, a power tool is provided having conditions and characteristics suitable for being manufactured and assembled in a cost-efficient manner.

Accordingly, a hand-held power tool is provided overcoming, or at least alleviating, at least some of the above-mentioned problems and drawbacks. As a result, the above-mentioned object is achieved.

Optionally, the electric motor is arranged to power the fan. As a result, a power tool is provided having conditions and characteristics suitable for being manufactured and assembled in a cost-efficient manner, partly because the need for a separate fan motor is circumvented. Moreover, conditions are provided for a compact power tool having a low weight.

Optionally, the fan is arranged on a motor shaft of the electric motor. As a result, a power tool is provided having conditions and characteristics suitable for being manufactured and assembled in a cost-efficient manner. Moreover, conditions are provided for a compact power tool having a low weight.

Optionally, the air-cooling path comprises at least one inlet upstream of the electric motor and at least one outlet downstream of the power supply arrangement. Thereby, a further efficient cooling of the electric motor and the power supply arrangement can be provided because the air can be guided through, and/or past, these components in an efficient manner.

Optionally, the electric motor comprises a motor casing, and wherein at least a portion of the air-cooling path extends through the motor casing. Thereby, a still further efficient cooling of the electric motor is provided. As a further result thereof, a more reliable power tool is provided, and a power tool is provided where the electric motor is allowed to operate at still higher power levels without becoming overheated.

Optionally, the electric motor comprises conductor windings, and wherein at least a portion of the air-cooling path extends through the conductor windings. Conductor windings are components of an electric motor generating a lot of heat during operation. Since at least a portion of the air-cooling path extends through the conductor windings, an efficient cooling of the conductor windings is provided. As a further result thereof, a more reliable power tool is provided, and a power tool is provided where the electric motor is allowed to operate at still higher power levels without becoming overheated.

Optionally, the electric motor comprises a motor shaft arranged to rotate around a motor axis, and wherein the flow direction of the air flow generated by the fan through the air-cooling path at the location of the electric motor extends substantially parallel to the motor axis. Thereby, an efficient cooling of the electric motor is provided, while conditions are provided for a compact power tool having a low weight.

Optionally, the power supply arrangement comprises a battery. Thereby, a user-friendly power tool is provided having an efficient cooling of the battery of the power tool.

Optionally, the power supply arrangement comprises a control unit configured to selectively apply electricity to the electric motor. Thereby, a power tool is provided having an efficient cooling of the control unit of the power tool.

Optionally, the power tool comprises a housing accommodating the power supply arrangement, and wherein the housing forms at least portions of delimiting surfaces of the air-cooling path. Thereby, a power tool is provided having an efficient cooling of components thereof, and conditions and characteristics suitable for being manufactured and assembled in a cost-efficient manner.

Optionally, the at least one inlet and/or the at least one outlet is/are formed by openings in the housing. Thereby, a power tool is provided having conditions and characteristics suitable for being manufactured and assembled in a cost-efficient manner.

Optionally, the housing further accommodates the electric motor and the fan. Thereby, a power tool is provided having an efficient cooling of components thereof, and conditions and characteristics suitable for being manufactured and assembled in a cost-efficient manner Optionally, the power tool comprises at least one wall arranged to hinder recirculation of air from an outlet portion of the fan to an inlet portion of the fan. Thereby, the air is pumped through the air-cooling path in a more efficient manner, with lower pumping losses, thus providing a further efficient cooling of the electric motor and the power supply arrangement in a cost and energy efficient manner.

Optionally, the at least one wall is a wall of the housing. Thereby, a power tool is provided having an efficient cooling of components thereof, and conditions and characteristics suitable for being manufactured and assembled in a cost-efficient manner.

Optionally, the power tool is a hand-held power tool comprising at least one handle portion. Thereby, a reliable hand-held power tool is provided having an efficient cooling of components thereof. Furthermore, a hand-held power tool is provided having conditions for generating a lower amount of noise during use. Moreover, a hand-held power tool is provided having conditions and characteristics suitable for being manufactured and assembled in a cost-efficient manner.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
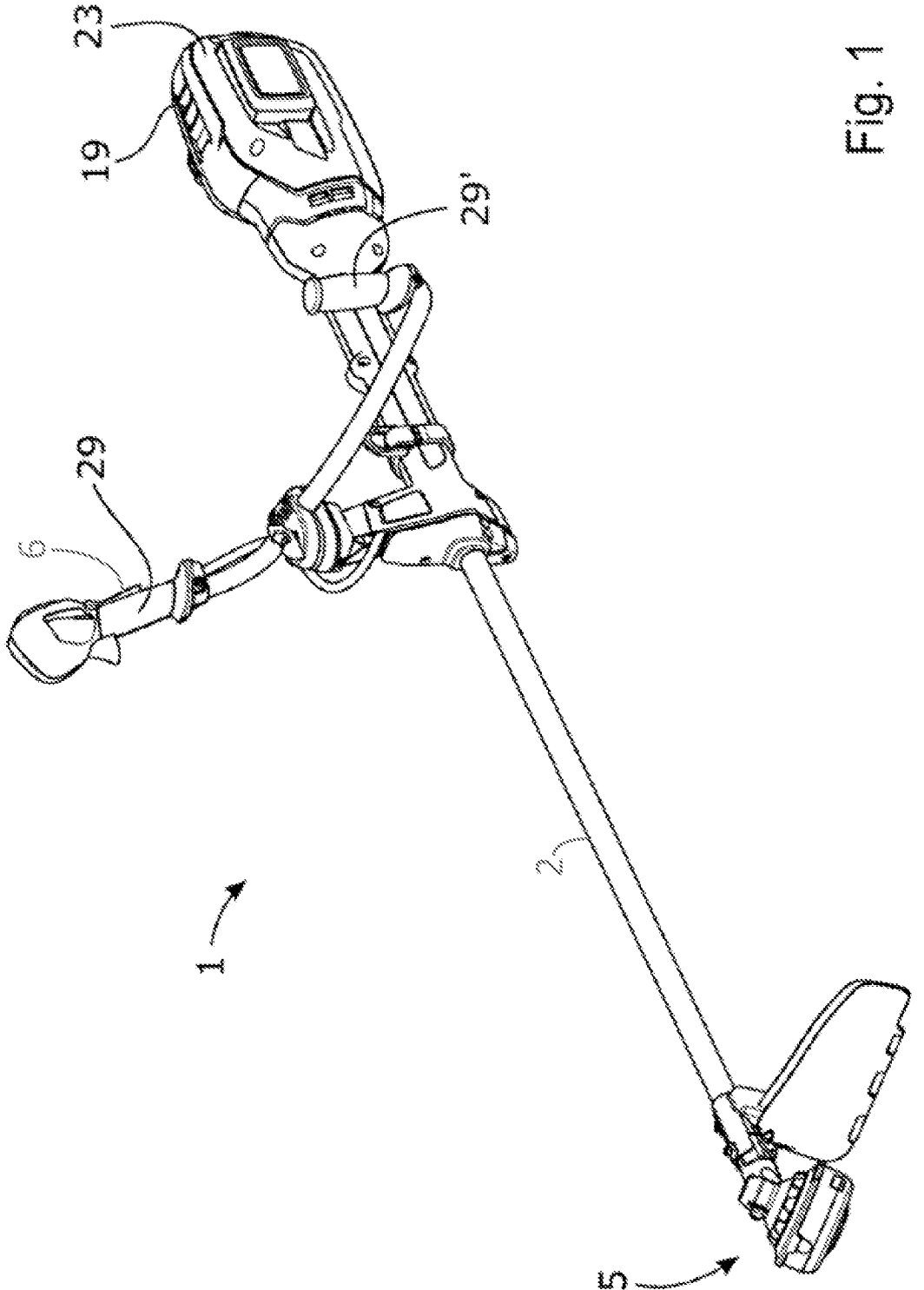
FIG. 1 illustrates a power tool according to some embodiments.

FIG. 1 illustrates a power tool 1 according to some embodiments. According to the illustrated embodiments, the power tool 1 is a trimmer. The power tool 1 comprises a tool 5 in the form of a trimmer head. It is to be understood that the illustrated power tool 1 constitutes example embodiments of the invention, which invention is defined only by the appended claims. Thus, according to embodiments herein, the power tool 1 may be another type of power tool than a trimmer, such as a chain saw, a circular saw, a multi-tool, a hedge trimmer, a drill, a lawn mower, or the like. Furthermore, is to be understood that, according to such embodiments, the tool, as referred to herein, may for example comprise a cutting chain, a saw blade, a cutting unit, a drill, or the like.

The power tool 1 is an electrically driven power tool 1. The power tool 1 comprises a housing 23, and as is further explained herein, the power tool 1 comprises an electric motor arranged in the housing 23. Moreover, according to the illustrated embodiments, the power tool 1 comprises a battery arranged in the housing 23. The electric motor is arranged to power the tool 5 using electricity from the battery. According to the illustrated embodiments, the power tool 1 comprises an elongated body 2 extending between the tool 5 and the housing 23. The power tool 1 comprises a shaft extending through the elongated body 2, wherein the shaft is arranged to transmit power from the electric motor to the tool 5.

According to the illustrated embodiments, the power tool 1 comprises a first handle portion 29 arranged to be gripped by one hand of a user and a second handle portion 29' arranged to be gripped by the other hand of the user. The first handle portion 29 comprises a safety switch 6 arranged to be pressed by the palm of the hand of the user. Furthermore, the first handle portion 29 of the power tool 1 comprises a throttle lever 8. According to the illustrated embodiments, the throttle lever 8 is arranged to be pressed by one or more fingers of the user. The throttle lever 8 allows a user to control the power outputted by the electric motor of the power tool 1.

Figure 2:
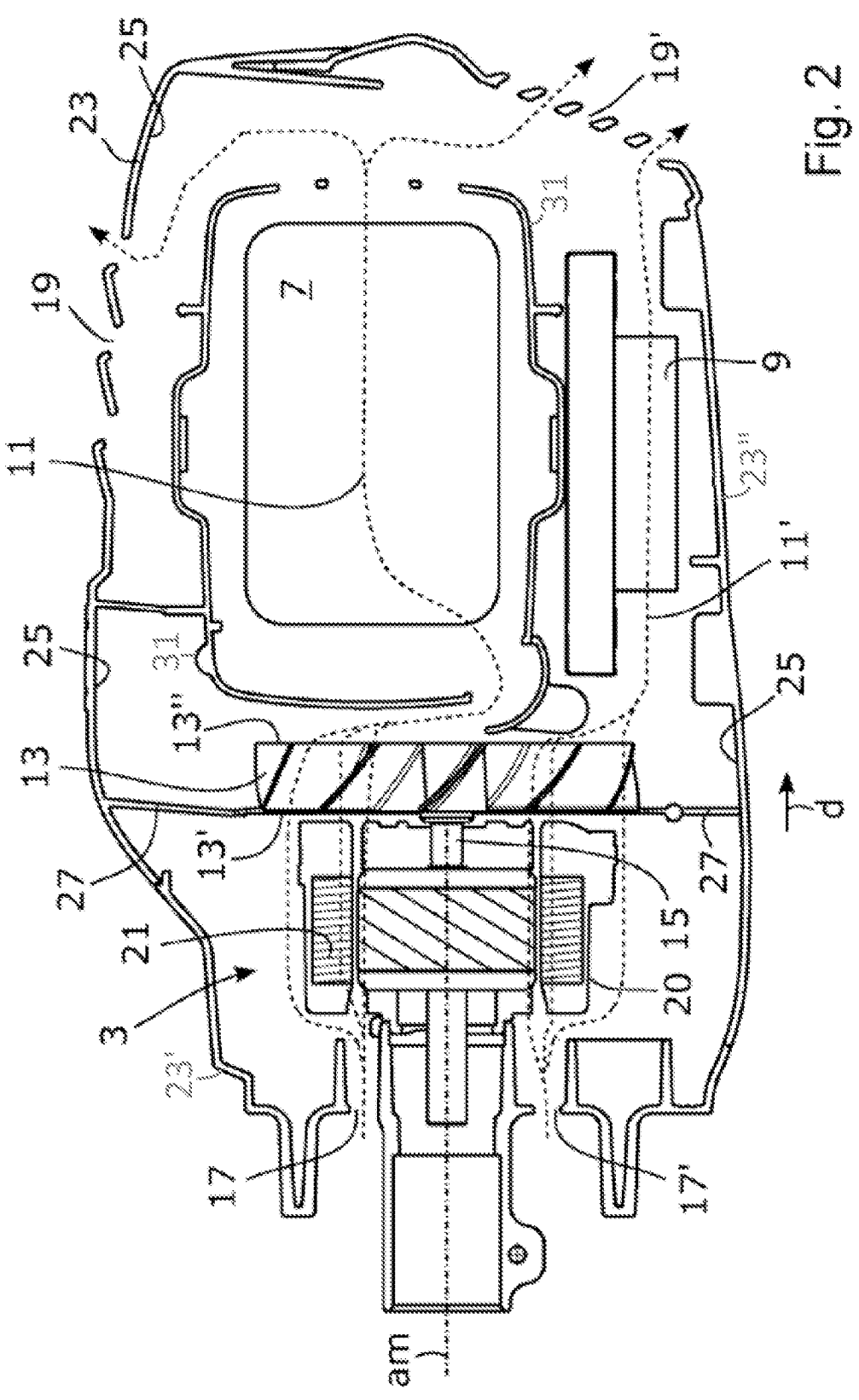
FIG. 2 illustrates a cross section through a housing of the power tool illustrated in FIG. 1.

FIG. 2 illustrates a cross section through the housing 23 of the power tool 1 illustrated in FIG. 1. In FIG. 2, the cross section is made in a plane comprising a motor axis am of the electric motor 3 of the power tool. The electric motor 3 comprises a motor shaft 15 arranged to rotate around the motor axis am. As mentioned, the electric motor 3 is configured to power the tool of the power tool. According to the illustrated embodiments, the electric motor 3 is a brushless DC electric motor, also known as an electronically commutated motor (ECMs, EC motor), or a synchronous DC motor. The power tool further comprises a power supply arrangement 7, 9 configured to supply electricity to the electric motor 3. According to the illustrated embodiments, the power supply arrangement 7, 9 comprises a battery 7 and a control unit 9. The control unit 9 is configured to selectively apply electricity to the electric motor 3. That is, according to the illustrated embodiments, the control unit 9 is arranged to apply electricity from the battery 7 to the electric motor 3 by an amount controlled by the throttle lever 8, illustrated in FIG. 1. The battery 7 may for example comprise a lithium-ion battery.

The power tool 1 comprises an air-cooling path 11, 11' extending past at least portions of the electric motor 3 and the power supply arrangement 7, 9 so as to cool the electric motor 3 and the power supply arrangement 7, 9 when air is flowing through the air-cooling path 11, 11'. The power tool 1 comprises a fan 13 arranged in the air-cooling path 11, 11' between the electric motor 3 and the power supply arrangement 7, 9. According to the illustrated embodiments, the fan 13 is an axial fan arranged on the motor shaft 15 of the electric motor 3. Thus, according to these embodiments, the electric motor 3 is arranged to power the fan 13, i.e. rotate the fan 13. The fan 13 is configured to generate an air flow through the air-cooling path 11, 11' in a flow direction d from the electric motor 3 towards the power supply arrangement 7, 9. In this manner, as is further explained herein, an efficient cooling is provided of the electric motor 3 and of the power supply arrangement 7, 9.

According to the illustrated embodiments, the housing 23 accommodates the power supply arrangement 7, 9, the electric motor 3, and the fan 13. Moreover, the housing 23 defines and delimits at least portions of the air-cooling path 11, 11' and forms at least portions of delimiting surfaces 25 of the air-cooling path 11, 11'. The air-cooling path 11, 11' comprises a first inlet 17 and a second inlet 17' each arranged upstream of the electric motor 3. The first and second inlets 17, 17' are each formed by openings in the housing 23. Moreover, according to the illustrated embodiments, the air-cooling path 11, 11' comprises a first outlet 19 and a second outlet 19' each arranged downstream of the power supply arrangement 7, 9. The first outlet 19 is also indicated in FIG. 1. Moreover, the first and second outlets 19, 19' are each formed by openings in the housing 23. Since the housing 23 accommodates the fan 13, and since the fan 13 is arranged in the air-cooling path 11, 11' between the electric motor 3 and the power supply arrangement 7, 9, noise generated by the fan 13 is attenuated in an efficient manner.

The electric motor 3 comprises a motor casing 20 and conductor windings 21. According to the illustrated embodiments, portions of the air-cooling path 11, 11' extends through the motor casing 20 and through the conductor windings 21. Moreover, as indicated by the dotted lines illustrating the air-cooling path 11, 11' in FIG. 2, a portion of the air-cooling path 11, 11' may also extend around the motor casing 20. In this manner, the electric motor 3 is cooled in an efficient manner because air may flow through the motor casing 20, through the conductor windings 21, as well as around the motor casing 20.

As understood from FIG. 2, during operation of the power tool, the fan 13 will create a pressure below a surrounding atmospheric pressure in an inner volume of a first housing portion 23' of the housing 23 which accommodates the electric motor 3. As a result thereof, ambient air will flow into the first and second inlets 17, 17', through and around the electric motor 3 towards the fan 13. From the fan 13, the air is pushed towards the power supply arrangement 7, 9. The fan 13 will thus create a pressure above surrounding atmospheric pressure in an inner volume of a second housing portion 23" of the housing 23 which accommodates the power supply arrangement 7, 9. The higher pressure in the second housing portion 23" will force air out of the first and second outlets 19, 19'.

According to the illustrated embodiments, the power tool 1 comprises walls 27 arranged to hinder recirculation of air from an outlet portion 13" of the fan 13 to an inlet portion 13' of the fan 13 within the housing 23. The walls 27 extend substantially radially from the fan 13 and seals the inner volume of the first housing portion 23' from the inner volume of the second housing portion 23" at locations radially outside of the fan 13. In this manner, the air is pumped through the air-cooling path 11, 11' in a more efficient manner with lower pumping losses. According to the illustrated embodiments, the walls 27 are internal walls of the housing 23. Thereby, the power tool can be assembled in a simple manner and conditions are provided for manufacturing the power tool in a cost-efficient manner.

As is indicated in FIG. 2, according to the illustrated embodiments, the air-cooling path 11, 11' is divided into a first air-cooling path portion 11 and a second air-cooling path portion 11' by inner walls 31 of the housing 23. Thus, according to the illustrated embodiments, the housing comprises walls 27, 31 which obstructs air in some directions and guides the air in other directions. The first air-cooling path portion 11 extends past portions of the battery 7 and the second air-cooling path portion 11' extends past portions of the control unit 9. Accordingly, during operation of the power tool, some of the air is pushed from the fan 13 through first air-cooling path portion 11 towards the first and/or second outlet 19, 19' and some of the air is pushed from the fan 13 through second air-cooling path portion 11' towards the first and/or second outlet 19, 19'. In this manner, the battery 7 and the control unit 9 are each efficiently cooled. As understood from the above, even though the dotted line indicating the second air-cooling path portion 11' is drawn through the second outlet 19', air flowing through the second air-cooling path portion 11' may flow out from the housing 23 also via the first outlet 19.

Moreover, according to the illustrated embodiments, the flow direction d of the air flow generated by the fan 13 through the air-cooling path 11, 11', at the location of the electric motor 3, extends substantially parallel to the motor axis am. The flow direction d may be an average flow direction d of the air flow generated by the fan 13 through the air-cooling path 11, 11', at the location of the electric motor 3. The term "substantially parallel to", as used herein, means that the angle between the motor axis am and the flow direction d is less than 10 degrees.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A hand-held power tool comprising:
   an electric motor configured to power a tool of the power tool,
   a power supply arrangement configured to supply electricity to the electric motor, an air-cooling path extending past at least portions of the electric motor and the power supply arrangement so as to cool the electric motor and the power supply arrangement when air is flowing through the air-cooling path, and a fan arranged in the air-cooling path between the electric motor and the power supply arrangement, wherein the fan is configured to generate an air flow through the air-cooling path in a flow direction from the electric motor towards the power supply arrangement, wherein the power tool comprises a housing accommodating the electric motor and the power supply arrangement, where in the electric motor comprises a motor casing, and portions of the air-cooling path extend through the motor casing, and around and past the motor casing, and wherein the electric motor is arranged to power the fan.

2. The hand-held power tool according to claim 1, wherein the fan is arranged on a motor shaft of the electric motor.

3. A hand-held power tool comprising:

an electric motor configured to power a tool of the power tool, a power supply arrangement configured to supply electricity to the electric motor, an air-cooling path extending past at least portions of the electric motor and the power supply arrangement so as to cool the electric motor and the power supply arrangement when air is flowing through the air-cooling path, and a fan arranged in the air-cooling path between the electric motor and the power supply arrangement, wherein the fan is configured to generate an air flow through the air-cooling path in a flow direction from the electric motor towards the power supply arrangement, wherein the power tool comprises a housing accommodating the electric motor and the power supply arrangement, where in the electric motor comprises a motor casing, and portions of the air-cooling path extend through the motor casing, and around and past the motor casing, wherein the electric motor comprises a motor shaft arranged to rotate around a motor axis, and wherein the flow direction of the air flow generated by the fan through the air-cooling path at the location of the electric motor extends substantially parallel to the motor axis.

4. A hand-held power tool comprising:

an electric motor configured to power a tool of the power tool, a power supply arrangement configured to supply electricity to the electric motor, an air-cooling path extending past at least portions of the electric motor and the power supply arrangement so as to cool the electric motor and the power supply arrangement when air is flowing through the air-cooling path, and a fan arranged in the air-cooling path between the electric motor and the power supply arrangement, wherein the fan is configured to generate an air flow through the air-cooling path in a flow direction from the electric motor towards the power supply arrangement, wherein the power tool comprises a housing accommodating the electric motor and the power supply arrangement, where in the electric motor comprises a motor casing, and portions of the air-cooling path extend through the motor casing, and around and past the motor casing, wherein the housing includes a first housing portion accommodating the electric motor, and a second housing portion accommodating the power supply arrangement, and wherein the power tool comprises at least one wall that extends from the fan and seals an inner volume of the first housing portion from an inner volume of the second housing portion radially outside the fan.

5. A hand-held power tool comprising:

an electric motor configured to power a tool of the power tool, a power supply arrangement including a battery, and a control unit configured to selectively apply electricity from the battery to the electric motor, an air-cooling path extending past at least portions of the electric motor, the battery and the control unit so as to cool the electric motor, the battery and the control unit when air is flowing through the air-cooling path, and a fan arranged in the air-cooling path between the electric motor and the power supply arrangement, wherein the electric motor is arranged to power the fan, and the fan is configured to generate an air flow through the air-cooling path in a flow direction from the electric motor towards the power supply arrangement, wherein the power tool comprises a housing accommodating the electric motor and the power supply arrangement, and wherein the electric motor comprises a motor casing, and portions of the air-cooling path extend through the motor casing, and around and past the motor casing.

6. The hand-held power tool according to claim 5, wherein the fan is arranged on a motor shaft of the electric motor.

7. The hand-held power tool according to claim 5, wherein the electric motor comprises a motor shaft arranged to rotate around a motor axis, and wherein the flow direction of the air flow generated by the fan through the air-cooling path at the location of the electric motor extends substantially parallel to the motor axis.

8. The hand-held power tool according to claim 5, wherein the housing includes a first housing portion accommodating the electric motor, and a second housing portion accommodating the power supply arrangement, and wherein the power tool comprises at least one wall that extends from the fan and seals an inner volume of the first housing portion from an inner volume of the second housing portion radially outside the fan.

* * * * *